US012559097B2

(12) United States Patent
Lim et al.

(10) Patent No.: US 12,559,097 B2
(45) Date of Patent: Feb. 24, 2026

(54) METHOD AND MOBILITY DEVICE USING THE METHOD FOR PATH PREDICTION THROUGH INTERACTION ANALYSIS BETWEEN OBJECTS USING ARTIFICIAL INTELLIGENCE

(71) Applicants: Hyundai Motor Company, Seoul (KR); KIA CORPORATION, Seoul (KR); KOREA UNIVERSITY RESEARCH AND BUSINESS FOUNDATION, Seoul (KR)

(72) Inventors: Hye Rin Lim, Seoul (KR); Jin Kyu Kim, Seoul (KR); Sung June Kim, Seoul (KR); Sang Pil Kim, Seoul (KR)

(73) Assignees: Hyundai Motor Company, Seoul (KR); Kia Corporation, Seoul (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 12 days.

(21) Appl. No.: 18/800,213

(22) Filed: Aug. 12, 2024

(65) Prior Publication Data

US 2025/0296554 A1     Sep. 25, 2025

(30) Foreign Application Priority Data

Mar. 20, 2024     (KR) ........................ 10-2024-0038555

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/0097* (2013.01);
(Continued)

(58) Field of Classification Search
CPC ............... B60W 30/09; B60W 30/095; B60W 30/0953; B60W 30/0956
See application file for complete search history.

(56) References Cited

U.S. PATENT DOCUMENTS

2021/0261167 A1*  8/2021  Kum ........................ G06N 3/08
2022/0017122 A1*  1/2022  Malla ....................... G06N 3/08
(Continued)

*Primary Examiner* — Anshul Sood
(74) *Attorney, Agent, or Firm* — Banner & Witcoff, Ltd.

(57) ABSTRACT

A method for controlling an autonomous driving of a vehicle is introduced. The method may comprise generating a weighted adjacency matrix from an object graph, based on a location relative to an anticipated collision point among objects. The method may further comprise, based on this matrix and a graph convolution layer of a high-order graph model, generating an Mth-order adjacency matrix, defining interrelations among objects across M number of hops, generating object attribute information from this matrix and feature information defining an attribute of an object, generating, based on a combination layer of the high-order graph model, cumulative feature information by integrating the object attribute information, embedding the cumulative feature information into the object graph, generating, based on the embedding and a predicted path model, an object's predicted path, and outputting, based on this predicted path, a signal for controlling the autonomous driving of the vehicle.

20 Claims, 13 Drawing Sheets

(51) Int. Cl.
  *B60W 50/00*      (2006.01)
  *B60W 60/00*      (2020.01)
  *G06N 3/04*       (2023.01)

(52) U.S. Cl.
  CPC .. *B60W 60/0015* (2020.02); *B60W 60/00274*
        (2020.02); *G06N 3/04* (2013.01); *B60W*
        *2554/4045* (2020.02); *B60W 2554/4046*
        (2020.02); *B60W 2554/80* (2020.02)

(56)                References Cited

U.S. PATENT DOCUMENTS

2022/0340170 A1* 10/2022 Xia ...................... G06N 3/0442
2023/0230484 A1*  7/2023 Al Faruque ............ G06V 20/56
2024/0025445 A1*  1/2024 Jiang ................... G06N 3/0464
2025/0128727 A1*  4/2025 Liu .......................... G06N 3/04

* cited by examiner

FIG. 4

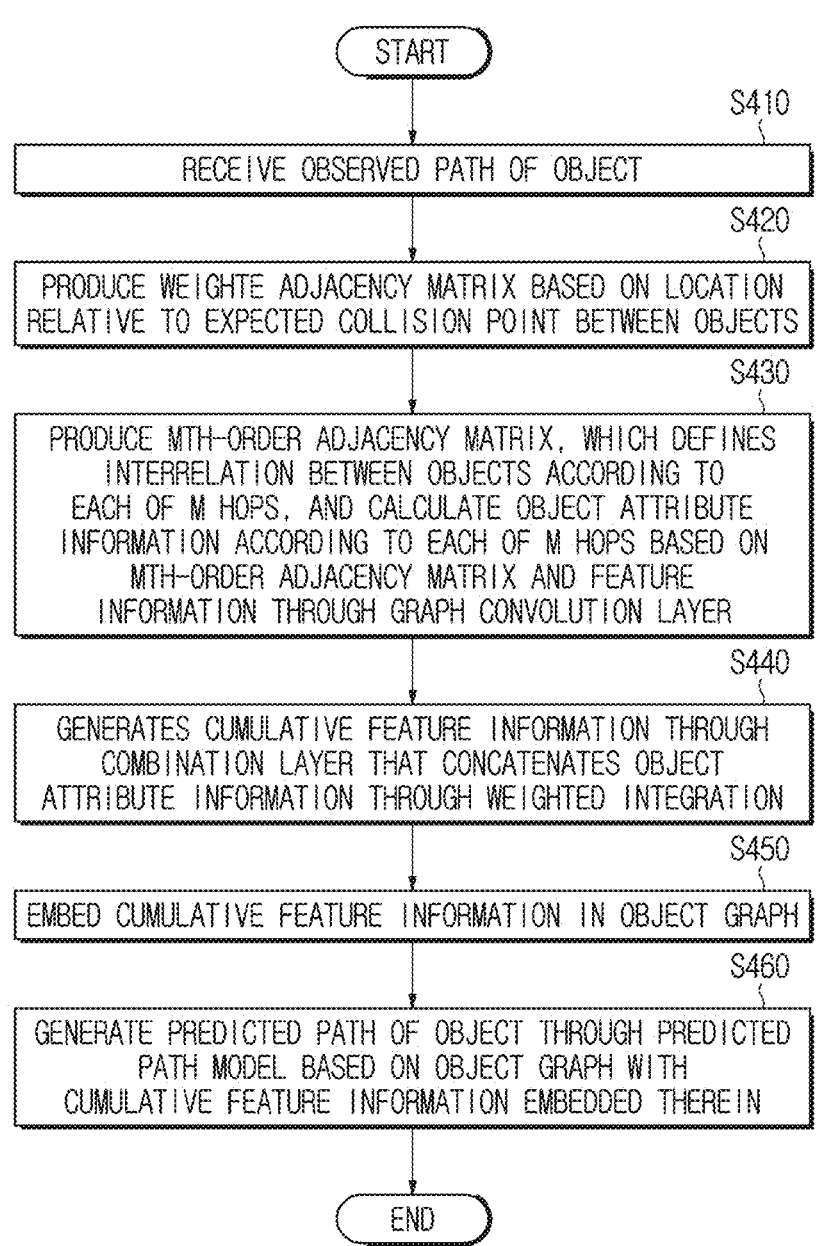

START

S410
RECEIVE OBSERVED PATH OF OBJECT

S420
PRODUCE WEIGHTE ADJACENCY MATRIX BASED ON LOCATION RELATIVE TO EXPECTED COLLISION POINT BETWEEN OBJECTS

S430
PRODUCE MTH-ORDER ADJACENCY MATRIX, WHICH DEFINES INTERRELATION BETWEEN OBJECTS ACCORDING TO EACH OF M HOPS, AND CALCULATE OBJECT ATTRIBUTE INFORMATION ACCORDING TO EACH OF M HOPS BASED ON MTH-ORDER ADJACENCY MATRIX AND FEATURE INFORMATION THROUGH GRAPH CONVOLUTION LAYER

S440
GENERATES CUMULATIVE FEATURE INFORMATION THROUGH COMBINATION LAYER THAT CONCATENATES OBJECT ATTRIBUTE INFORMATION THROUGH WEIGHTED INTEGRATION

S450
EMBED CUMULATIVE FEATURE INFORMATION IN OBJECT GRAPH

S460
GENERATE PREDICTED PATH OF OBJECT THROUGH PREDICTED PATH MODEL BASED ON OBJECT GRAPH WITH CUMULATIVE FEATURE INFORMATION EMBEDDED THEREIN

END

Observed Trajectories (a) Agent i vs Agent j (b) Agent i vs Agent k (c) Agent j vs Agent k

FIG. 12

| | ETH | HOTEL | UNIV | ZARA1 | ZARA2 | AVG | SDD |
|---|---|---|---|---|---|---|---|
| Social-GAN [6] | 1.03/2.02 | 0.90/1.97 | 0.58/1.22 | 0.38/0.84 | 0.47/1.01 | 0.78/1.41 | 27.23/41.44 |
| + HighGraph | 0.91/1.72 | 0.54/1.08 | 0.56/1.18 | 0.37/0.77 | 0.40/0.83 | 0.55/1.11 | 18.60/37.00 |
| | 11%/14% | 40%/45% | 3%/3% | 3%/8% | 14%/17% | 29%/21% | 31%/10% |
| SoPhie [24] | 0.90/1.60 | 0.87/1.82 | 0.49/1.19 | 0.38/0.72 | 0.38/0.79 | 0.61/1.22 | 17.76/32.14 |
| + HighGraph | 0.73/1.24 | 0.66/1.37 | 0.46/0.97 | 0.34/0.67 | 0.33/0.68 | 0.50/0.99 | 16.60/30.40 |
| | 18%/22% | 24%/24% | 6%/18% | 10%/6% | 13%/13% | 18%/19% | 6%/5% |
| Social-STGCNN [16] | 0.64/1.11 | 0.49/0.85 | 0.44/0.79 | 0.34/0.53 | 0.30/0.48 | 0.44/0.75 | 20.60/33.10 |
| + HighGraph | 0.60/0.93 | 0.31/0.40 | 0.40/0.70 | 0.33/0.49 | 0.29/0.45 | 0.39/0.59 | 15.38/26.41 |
| | 6%/16% | 36%/52% | 9%/11% | 3%/7% | 3%/6% | 11%/21% | 25%/20% |
| BiTraP [33] | 0.50/0.98 | 0.17/0.28 | 0.25/0.47 | 0.23/0.45 | 0.16/0.33 | 0.27/0.50 | 9.09/16.31 |
| + HighGraph | 0.47/0.73 | 0.17/0.27 | 0.25/0.47 | 0.18/0.33 | 0.11/0.23 | 0.24/0.41 | 8.83/14.90 |
| | 16%/25% | 0%/3% | 0%/0% | 21%/26% | 31%/30% | 11%/18% | 3%/8% |
| Social VAE [31] | 0.47/0.76 | 0.14/0.22 | 0.25/0.47 | 0.20/0.37 | 0.14/0.28 | 0.24/0.42 | 8.88/14.81 |
| + HighGraph | 0.45/0.72 | 0.14/0.21 | 0.23/0.46 | 0.19/0.34 | 0.14/0.27 | 0.23/0.40 | 8.67/13.72 |
| | 4%/5% | 0%/4% | 0%/2% | 5%/8% | 0%/3% | 4%/4% | 2%/7% |

METHOD AND MOBILITY DEVICE USING THE METHOD FOR PATH PREDICTION THROUGH INTERACTION ANALYSIS BETWEEN OBJECTS USING ARTIFICIAL INTELLIGENCE

CROSS REFERENCE TO RELATED APPLICATION

The present application claims the benefit of priority to Korean Patent application No. 10-2024-0038555, filed Mar. 20, 2024, the entire contents of which are incorporated herein by reference.

TECHNICAL FIELD

The present disclosure relates to a method for predicting a path through interaction analysis between objects using an artificial intelligence and a mobility device using the method, and more particularly, to a method for predicting a path of an object by using a high-order graph model (High-Graph Network) that captures indirect interrelation between objects, that is, through interaction analysis between objects using an artificial intelligence, and a mobility device using the method.

BACKGROUND

Paths of objects on roads need to be accurately predicted in order to develop an autonomous driving system and a planned city.

As an object may be influenced by another object when determining its path, accurate prediction of a path of an object may take analysis of interaction between objects.

However, studies about social interaction between objects mostly deal with the size of direct interaction between individuals or between groups, but not about indirect and high-order interaction where interaction between individuals affects a third party.

For example, a learning model for predicting a path through analysis of interaction between objects may be trained to adjust weights in inverse proportion to a distance between objects thereby preventing collision therebetween.

Accordingly, there exists a demand for method of analyzing high-order interaction where a specific object affects a third-party object in stages.

SUMMARY

According to the present disclosure, a method for controlling an autonomous driving of a vehicle, the method may comprise generating, based on a location relative to an expected collision point between objects, a weighted adjacency matrix from an object graph, wherein the object graph represents a relation between the objects, generating, based on the weighted adjacency matrix and a graph convolution layer of a high-order graph model, an Mth-order adjacency matrix, wherein the Mth-order adjacency matrix defines interrelations between the objects at each of M number of hops, and wherein the high-order graph model captures indirect interrelations between the objects, determining, based on the Mth-order adjacency matrix and feature information defining an attribute of an object, object attribute information, generating, based on a combination layer of the high-order graph model, cumulative feature information by integrating the object attribute information, wherein the object attribute information is weighted for the integrating, embedding the cumulative feature information into the object graph, wherein the cumulative feature information is embedded into a target node of the object graph, generating, based on the embedding and a predicted path model, a predicted path of the object, and outputting, based on the predicted path of the object, a signal for controlling the autonomous driving of the vehicle.

The method, wherein the generating the weighted adjacency matrix may comprise applying a weight to an adjacency matrix, wherein the adjacency matrix expresses, based on a distance between the object and the expected collision point and based on a distance between the objects, concatenation relations between the objects.

The method, wherein the expected collision point is determined, based on a direction vector of the object, by an intersection between half-lines, wherein the direction vector is formed based on a current location of the object.

The method, wherein the expected collision point is determined by reflecting a semantic map that May comprise semantic location information on environment of the object.

The method, wherein the determining the object attribute information may comprise performing matrix multiplication for the feature information, the Mth-order adjacency matrix, and a weight for learning the interrelations between the objects at each of the M number of hops.

The method, wherein the Mth-order adjacency matrix is generated based on M number of superpositions of the weighted adjacency matrix.

The method, wherein the generating the cumulative feature information may comprise generating the cumulative feature information by extracting multiple pieces of the object attribute information as a single piece of information through the combination layer, wherein the determining the object attribute information may comprise determining the object attribute information based on the interrelations between the objects at each of the M number of hops.

The method, wherein the extracting may comprise concatenating, based on a learnable weight allocated according to each of the M number of hops and weighted integration, the object attribute information at each of the M number of hops, and extracting the single piece of information from the concatenated object attribute information.

The method, wherein the high-order graph model is modularized as a plug-and-play structure and is combined with the predicted path model.

The method, wherein the feature information may comprise behavioral information and state information according to a class of the object.

According to the present disclosure, an apparatus for controlling an autonomous driving of a vehicle, the apparatus may comprise a processor and a memory configured to store at least one instruction, when executed by the processor, may cause the apparatus to produce, based on a location relative to an expected collision point between objects, a weighted adjacency matrix from an object graph, wherein the object graph represents a relation between the objects, produce, based on the weighted adjacency matrix and a graph convolution layer of a high-order graph model, an Mth-order adjacency matrix, wherein the Mth-order adjacency matrix defines interrelations between the objects at each of M number of hops, and wherein the high-order graph model captures indirect interrelations between the objects, determine, based on the Mth-order adjacency matrix and feature information defining an attribute of an object, object attribute information, generate, based on a combination layer of the high-order graph model, cumulative feature information by integrating the object attribute information, wherein the object attribute information is weighted for the integrating, and embed the cumulative feature information into the object graph, wherein the cumulative feature information is embedded into a target node of the object graph, generate, based on the embedment and a predicted path model, a predicted path of the object, and output, based on the predicted path of the object, a signal for controlling the autonomous driving of the vehicle.

The apparatus, wherein the at least one instruction, when executed by the processor, may further cause the apparatus to apply a weight to an adjacency matrix, wherein the adjacency matrix expresses, based on a distance between the object and the expected collision point and based on a distance between the objects, concatenation relations between the objects.

The apparatus, wherein the expected collision point is determined, based on a direction vector of the object, by an intersection between half-lines, wherein the direction vector is formed based on a current location of the object.

The apparatus, wherein the expected collision point is determined by reflecting a semantic map that May comprise semantic location information on environment of the object.

The apparatus, wherein the at least one instruction, when executed by the processor, may further cause the apparatus to perform matrix multiplication for the feature information, the Mth-order adjacency matrix, and a weight for learning the interrelations between the objects at each of the M number of hops.

The apparatus, wherein the Mth-order adjacency matrix is produced based on M number of superpositions of the weighted adjacency matrix.

The apparatus, wherein the at least one instruction, when executed by the processor, may further cause the apparatus to determine the object attribute information based on the interrelations between the objects at each of the M number of hops, and extract multiple pieces of the object attribute information as a single piece of information through the combination layer.

The apparatus, wherein the at least one instruction, when executed by the processor, may further cause the apparatus to concatenate, based on a learnable weight allocated according to each of the M number of hops and weighted integration, the object attribute information at each of the M number of hops, and extract the single piece of information from the object attribute information concatenated.

The apparatus, wherein the high-order graph model is modularized as a plug-and-play structure and is combined with the predicted path model.

The apparatus, wherein the feature information may comprise behavioral information and state information according to a class of the object.

BRIEF DESCRIPTION OF THE DRA WINGS

FIG. 4 shows an example of a flowchart showing a process of predicting a path of an object through a high-order graph model according to the present disclosure.

FIG. 12 shows an example of quantitative increase and decrease of performance according to application of a high-order graph model to a predicted path model.

DETAILED DESCRIPTION

Figure 1:
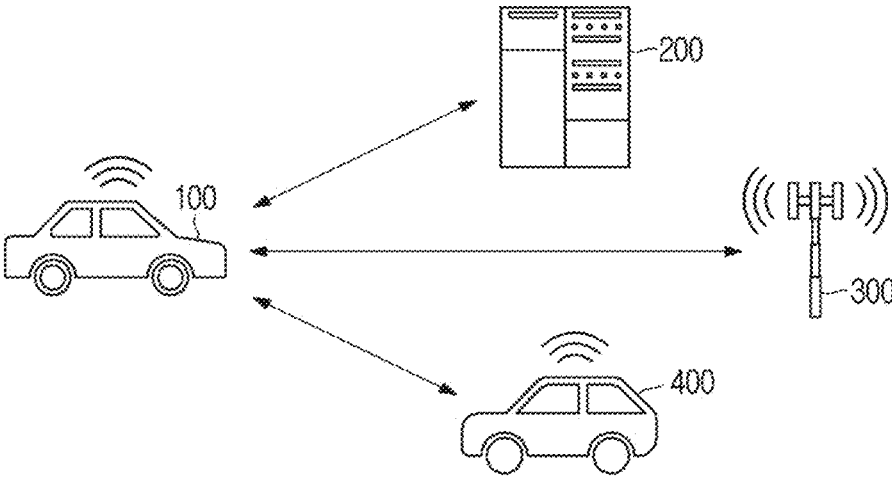
FIG. 1 shows an example of a mobility device communicating with another device to transmit and receive data.

Herein after, examples of the present disclosure will be described in detail with reference to the accompanying drawings so that those skilled in the art may easily implement the present disclosure. However, the present disclosure may be implemented in various different ways, and is not limited to the examples described therein.

In describing examples of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition or alternative, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an example could be termed a second element in another example, and, similarly, a second element in an example could be termed a first element in another example, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units.

Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition or alternative, examples including other elements in addition or alternative to the elements described in the various examples are also included in the scope of the present disclosure.

The advantages and features of the present disclosures and the way of attaining them will become apparent with reference to examples described below in detail in conjunction with the accompanying drawings. Examples, however, may be embodied in many different forms and should not be constructed as being limited to example examples set forth herein. Rather, these examples are provided so that this disclosure will be complete and will fully convey the scope of the disclosures to those skilled in the art.

In the present disclosure, each of phrases such as "A or B", "at least one of A and B", "at least one of A or B", "A, B or C", "at least one of A, B and C", "at Each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and in case drawings illustrated in the present specification are inversed, the location relations described in the specification may be inversely understood.

FIG. 1 shows an example of a mobility device communicating with another device to transmit and receive data.

Referring to FIG. 1, a mobility device 100 may be driven based on electric energy or fossil energy. In the case of electric energy, for example, the mobility device 100 may be a pure battery-based mobility driven only by a high-voltage battery or employ a gas-based fuel cell as an energy source. In addition or alternative, the fuel cell May use various types of gas capable of generating electric energy, and for example, the gas may be hydrogen. However, without being limited thereto, various gases may be applicable. In the case of fossil energy, the mobility device 100 is driven based on fuels such as gasoline, diesel, or liquefied gas, and may be equipped with an engine that drives a wheel drive unit 114 by combustion of the fuel. The engine may be included in an energy generator 112 from a perspective of providing a driving torque of a wheel to the wheel drive unit 114.

For convenience of explanation, the present disclosure describes the mobility device 100 as an example mobility based on electric energy, but except regenerative braking, charge, and discharge described in the present disclosure, an example of the present disclosure may certainly be applicable to a mobility based on fossil energy.

The mobility device 100 may refer to a moving object capable of physically moving through space. The mobility device 100 is a vehicle as a ground moving object driven on the ground and may be a normal passenger vehicle or commercial vehicle, a purpose built vehicle (PBV), and the like. The mobility device 100 may be a four-wheel vehicle, for example, a sedan, a sports utility vehicle (SUV), and a pickup truck and may also be a vehicle with five or more wheels, for example, a bus, a lorry, a container truck, and a heavy vehicle. In addition or alternative, the mobility device 100 may include a means of aerial transportation such as an airplane, a drone, and a helicopter and, without being limited thereto, may also include a means of transportation capable of moving in the sea such as a ship and a submarine.

The mobility device 100 may be driven by being controlled in autonomous driving, and the autonomous driving may be implemented as semi-autonomous driving or full autonomous driving. Full autonomous driving May be provided as autonomous moving under the complete control of a processor 120 of the mobility device 100 without a user's intervention even in an uncertain driving situation. Semi-autonomous driving may be provided as autonomous moving that requires a driver's intervention in a specific driving situation. If the driving situation occurs, semi-autonomous driving may be implemented such that the processor 120 disables autonomous driving and switches control to the user, and thus the user performs manual driving. According to the autonomous driving levels defined by the Society of Automotive Engineers (SAE), semi-autonomous driving may correspond to the autonomous driving levels 1 to 4, and full autonomous driving may correspond to the level 5.

At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein.

Meanwhile, the mobility device 100 may communicate with other devices 200 and 300 or another mobility device 400. For example, another device may include the server 200 for supporting various control, state management and driving of the mobility device 100, the ITS device 300 for receiving information from an intelligent transportation system (ITS), and various types of user devices. For example, the server 200 is an external device operated by a mobility manufacturer or provided for an autonomous driving service and may receive connected data of the mobility device 100 or transmit data necessary for autonomous driving. In order to support autonomous driving and various services for the mobility device 100, the server 200 may transmit various types of information and software modules used for controlling the mobility device 100 to the mobility device 100 as a response to a request and data transmitted from the mobility device 100 and a user device. For example, the server 200 according to the present disclosure may transmit data about a high-order graph model, which captures indirect interrelation between objects, to the mobility object 100. In addition or alternative, the server may modularize a high-order graph model, mount the high-order graph model in a predicted path model and then provide the model to the mobility device 100.

For example, the ITS device 300 may be a road side unit (RSU), and the ITS device 300 may assist a user in driving his own car or support autonomous driving of the mobility device 100 by exchanging mobility recognition data, driving control and situation data, environment data surrounding a mobility, and map data through V2I with the mobility device 100. Through V2V with another mobility device 400, the mobility device 100 may support a driver's driving his own car or autonomous driving by exchanging the above-listed data.

The mobility device 100 may communicate with another mobility or another device based on cellular communication, wireless access in vehicular environment (WAVE) communication, dedicated short range communication (DSRC) or short range communication, or any other communication scheme.

For example, the mobility device 100 may use LTE as a cellular communication network, a communication network such as 5G, a WiFi communication network, a WAVE communication network, and the like to communicate with the server 200, the ITS device 300, and another mobility 400. As another example, DSRC used in the mobility device 100 may be used for mobility-to-mobility communication. A communication scheme among the mobility device 100, the server 200, the ITS device 300, another mobility device 400, and a user device is not limited to the above-described example.

Figure 2:
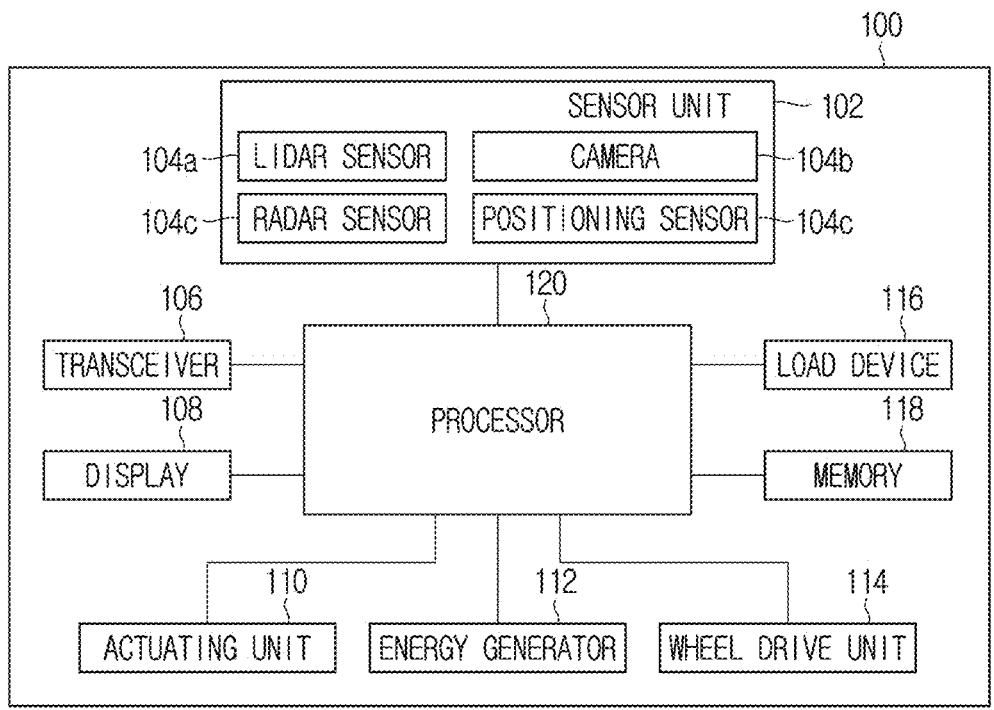
FIG. 2 shows an example of constituent modules of a mobility device according to the present disclosure.

FIG. 2 shows an example of constituent modules of a mobility device according to the present disclosure.

The mobility device 100 may include a sensor unit 102 (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.), a transceiver 106, a display 108, an actuating unit 110, an energy generator 112, a wheel drive unit 114, a load device 116, a memory 118, and a processor 120. Each constituent element is not a necessary constituent element, an additional configuration may be provided or omitted, and one configuration may be included in another configuration or be combined therewith so that a single configuration may perform a plurality of functions.

The sensor unit 102 may be equipped with various types of detectors for sensing various states and situations occurring in external and internal environments of the mobility device 100 and for identifying location information of the mobility device 100. That is, the sensor unit 102 may be configured as a multiple sensor module including heterogeneous sensors to obtain sensing data detected from each of the sensors.

Specifically, the sensor unit 102 may be equipped with a camera 104b and a radar sensor 104c for recognizing dynamic and static objects present around the mobility device 100 and have a positioning sensor 104d capable of obtaining location information of the mobility device 100. The sensor unit 102 may obtain sensor data including three-dimensional recognition data, perception/observation data, and positioning information by the above-described sensors. A three-dimensional (3D) perception sensor corresponds to a Lidar sensor, and these two terms may be used interchangeably below. Perception/observation data may include image data for a camera and radar data.

The Lidar sensor 104a may be a type of 3D recognition sensor according to the present disclosure, and the terms 'Lidar sensor' and '3D recognition sensor' may be used interchangeably below. The Lidar sensor 104a may be a sensor that observes a surrounding environment based on laser scanning and perceives a three-dimensional shape of an object. Specifically, the Lidar sensor 104a may obtain three-dimensional recognition data for a surrounding environment and an object by scanning laser around the mobility device 100. Three-dimensional recognition data may include a point cloud representing a three-dimensional shape of an object, that is, detection data and image data for observation representing a surrounding environment. For example, detection data may be provided to identify each object by representing three-dimensional contours and shapes of objects and an arrangement of objects. For example, image data may be provided to identify an object and a surrounding environment through images of the object and the surrounding environment.

The camera 104b may obtain two-dimensional (2D) image data or image data with depth information for a surrounding environment of the mobility device 100 and an object. According to the present disclosure, the camera 104b may include a monocular camera or a multi-camera. For example, the radar sensor 104c may irradiate an electromagnetic wave with a predetermined wavelength and thus detect a behavior of an object based on an electromagnetic wave reflected from the object. For example, the behavior of an object may include the presence of the object, whether the object moves, a distance between the mobility device 100 and the object, a speed of the object, and a movement direction.

Apart from the positioning sensor 104d, the sensor unit 102 may be equipped with a gyro sensor, an acceleration sensor, a wheel sensor, an autometer, a speed sensor and the like, in order to identify its own location, driving position, and speed. In addition or alternative, to monitor a user inside the mobility device 100, a condition of an occupant, and an operating situation of an internal device of the mobility device 100 that a user is capable of maneuvering, the sensor unit 102 may have an inward-facing camera 104b, a biosensor for detecting bio signals of a driver and an occupant, and various detection modules for detecting the operation and state of an internal device.

The present disclosure mainly describes sensors of the sensor unit 102 referred to for description of an example but may further include a sensor for detecting various situations not listed herein.

The transceiver 112 may support mutual communication with the server 200, the ITS device 300, and the neighbor mobility device 400. In the present disclosure, the mobility device 100 may transmit and receive data used in the method according to the present disclosure to and from the outside through the transceiver 116. For example, the mobility device 100 may receive, from the server 200, a trained high-order graph model or a predicted path model with which a trained high-order graph model is combined by being modularized.

The display 108 may serve as a user interface. By the processor 120, the display 108 may display an operating state and a control state of the mobility device 100, path/traffic information, information on an energy remaining quantity, a content requested by a driver, and the like to be output. The display 108 may be configured as a touch screen capable of sensing a driver input and receive a request of a driver indicated to the processor 120.

A user may activate or deactivate an autonomous driving function through a soft-type interface like a touch of the display 108 or a hard-type interface provided in a predetermined position inside the mobility device 100. In the case of a hard-type interface, for example, a button or key for an autonomous driving function may be installed on a steering wheel, a dashboard, and the like. In addition or alternative, the interfaces may be configured to provide detailed options for selecting various functions provided at a corresponding level of autonomous driving.

Meanwhile, the mobility device 100 may include the actuating unit 110, the energy generator 112, the wheel drive unit 114, and the load device 116.

The actuating unit 110 may be equipped with at least one module for implementing a driving operation and perform at least one driving operation of longitudinal control like acceleration/deceleration and transverse control like steering. The actuating unit 110 may be equipped with not only a pedal and a steering wheel accepting a user's request for the control but also various operating modules for generating a driving operation according to the request in the wheel drive unit 114.

The energy generator 112 may generate and supply power and electricity used for a driving power system like the wheel drive unit 114 and the load device 116. In case the mobility device 100 is driven based on electric energy, for example, the energy generator 112 may be configured as an electric battery or be configured as a combination of an electric battery and a fuel cell for charging the battery. In the case of a combination of an electric battery and a fuel cell, the energy generator 112 may include a tank for storing a material used to produce power of the fuel cell, for example, hydrogen gas. In case the mobility device 100 is driven based on fossil energy, the energy generator 112 may be configured as an internal combustion engine.

The wheel drive unit 114 may include a plurality of wheels, a driving force transfer module for generating and giving a driving force to wheels or for transferring a driving force, a braking module (e.g., hydraulic retarder, electric retarder) for decelerating the driving of wheels, and a steering module for realizing transverse control of wheels. In case the mobility device 100 is driven based on electric energy, a driving force transfer module may be configured as a motor module that generates a driving force based on electric power output from an electric battery. In case the mobility device 100 is operated based on fossil energy, a driving force transfer module may be equipped with transmission and a gear module that transfer power of an internal combustion engine.

The load device 116 may be an auxiliary equipment mounted on the mobility device 100, which consumes power supplied from the energy generator 112 by use of an occupant or user or converted from output of the energy generator 112. In the present disclosure, the load device 116 may be a type of electric device for non-driving purpose excluding a driving power system like the wheel drive unit 114. For example, the load device 114 may be various devices installed in an air-conditioning system, a light system, a seat system and the mobility device 100.

In addition or alternative, the mobility device 100 may include a memory 118 and the processor 120.

The memory 118 may store an application for controlling the mobility device 100 and various data and load the application or read and record data at a request of the processor 120. In the present disclosure, the memory 118 may store an application and at least one instruction that receive an observed path of an object, produce a weighted adjacency matrix based on a location relative to an expected collision point between objects from an object graph, produce a Mth-order adjacency matrix defining interrelation between objects according to each of M hops through a graph convolution layer of a high-order graph model, calculate object attribute information according to interrelation at each of M hops by reflecting feature information defining an attribute of an object in the Mth-order adjacency matrix, generate cumulative feature information by weighted integration of object attribute information through a combination layer of the high-order graph model, embed the cumulative feature information into a target node of the object graph, and generate a predicted path of an object through a predicted path model based on the embedded object graph.

The memory 118 may hold a predicted path model that analyzes an expected path of an object by using a high-order embedding vector with a vector structure produced from an object graph with embedded cumulative feature information. As an example, a predicted path model may be constructed in an encoder-decoder structure, and a high-order graph model may be modularized and located in an input unit of an encoder of the predicted path model to provide a high-order embedding vector to the encoder. A method of combining a predicted path model and a high-order graph model is not limited to the above-described example, which will be described below.

A high-order graph model and a predicted path model provided to the mobility device 100 may be pre-trained by the server 200 based on three-dimensional recognition data, image data, radar data, and location data that are already collected from the mobility device 100, the server 200, and another mobility device 400. The server 200 may update the high-order graph model and the predicted path model based on the above-described data that are recognized in real time during driving.

The processor 120 may perform overall control of the mobility device 100. The processor 120 may be configured to execute an application and an instruction stored in the memory 118. The processor 120 may activate autonomous driving in response to an autonomous driving request by a user or a setting of the mobility device 100 itself and control the mobility device 100 to activate autonomous driving at a level applied to the mobility device 100. In addition or alternative, the processor 120 may deactivate autonomous driving by a user's release or at a request according to automatic release and control the mobility device 100 to be manually driven.

Next, referring to FIG. 3, detailed modules of a server training a high-order graph model will be described according to the present disclosure.

Figure 3:
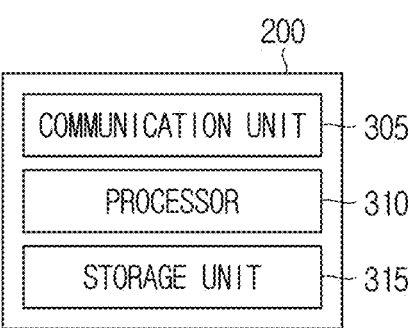
FIG. 3 shows an example of constituent modules of a server according to the present disclosure.

FIG. 3 shows an example of constituent modules of a server according to the present disclosure. The server may include a communication unit 305, a processor 310, and a storage unit 315. Each constituent element is not a necessary constituent element, an additional configuration may be provided or omitted, and one configuration May be included in another configuration or be combined therewith so that a single configuration may perform a plurality of functions.

The communication unit 305 may communicate with the mobility device 100 based on cellular communication, wireless access in vehicular environment (WAVE) communication, dedicated short range communication (DSRC) or short range communication, or any other communication scheme. The server 200 may transmit a trained high-order graph model or a predicted path model with which a trained high-order graph model is combined by being modularized, to the mobility device 100 through the communication unit 305.

The storage unit 315 may store an application for controlling the server 200 and various data and load the application or read and record data at a request of the processor 310. In the present disclosure, the storage unit 315 may store an application and at least one instruction that receive an observed path of an object, produce, by using the observed path as training data, a weighted adjacency matrix based on a location relative to an expected collision point between objects from an object graph that represents a relation between objects based on the observed path, produce a Mth-order adjacency matrix defining interrelation between objects according to each of M hops through a graph convolution layer of a high-order graph model, calculate object attribute information according to interrelation at each of M hops by reflecting feature information defining an attribute of an object in the Mth-order adjacency matrix, generate cumulative feature information by weighted integration of object attribute information through a combination layer of the high-order graph model, embed the cumulative feature information into a target node of the object graph, generate a predicted path of an object through a predicted path model based on the embedded object graph, and train the high-order graph model through a loss function based on a result of the predicted path model.

The processor 310 may perform overall control of the server 200. The processor 310 may be configured to execute an application and an instruction stored in the storage unit 315. In the present disclosure, the processor 310 may receive an observed path of an object, produce, by using the observed path as training data, a weighted adjacency matrix based on a location relative to an expected collision point between objects from an object graph that represents a relation between objects based on the observed path, produce a Mth-order adjacency matrix defining interrelation between objects according to each of M hops through a graph convolution layer of a high-order graph model, calculate object attribute information according to interrelation at each of M hops by reflecting feature information defining an attribute of an object in the Mth-order adjacency matrix, generate cumulative feature information by weighted integration of object attribute information through a combination layer of the high-order graph model, embed the cumulative feature information into a target node of the object graph, generate a predicted path of an object through a predicted path model based on the embedded object graph, and train the high-order graph model through a loss function based on a result of the predicted path model.

Figure 10:
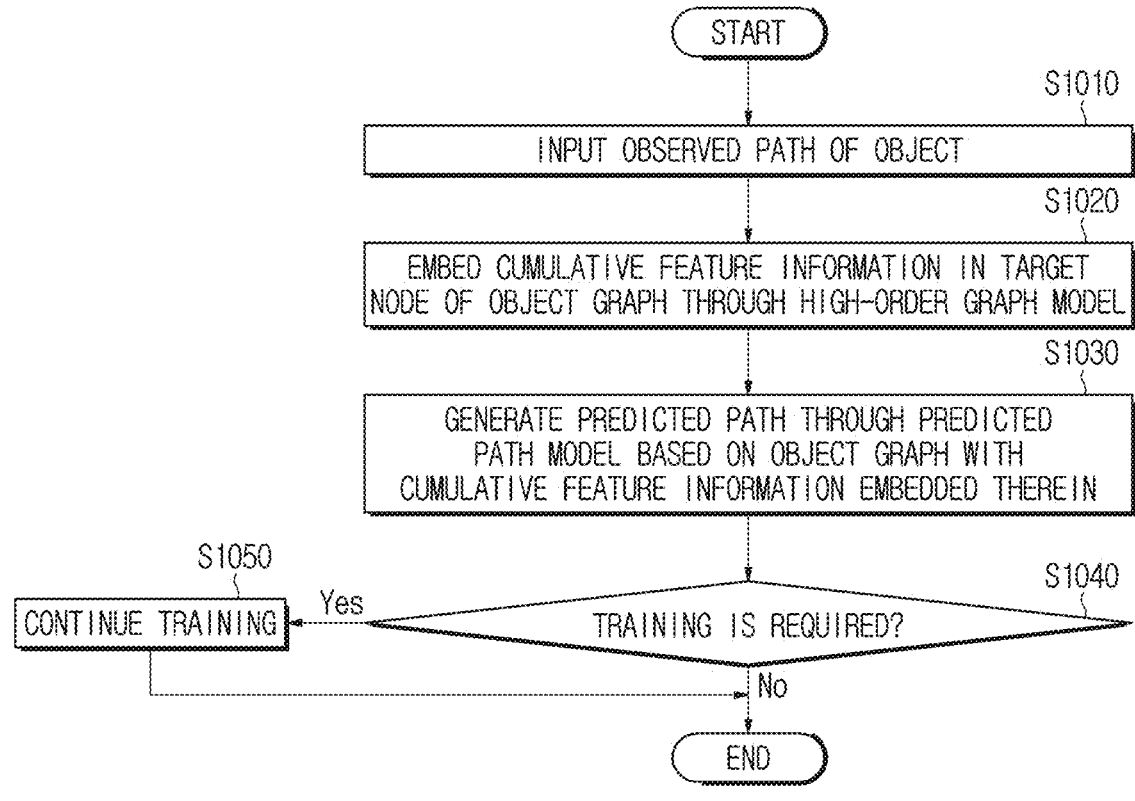
FIG. 10 shows an example of a flowchart showing a process of training a high-order graph model.

A process of training a high-order graph model will be described in detail through FIG. 10.

FIG. 4 shows an example of a flowchart showing a process of predicting a path of an object through a high-order graph model according to the present disclosure. The processor 120 of the mobility device 100 receives an observed path of an object (S410) and produces a weighted adjacency matrix from data about the observed path of the object based on a location relative to an expected collision point between objects (S420). The data about the observed path of the object may mean data about a path that is observed for a predetermined frame for a plurality of objects. The data may be two-dimensional information on the observed path of the object, but without being limited thereto, may be configured as three-dimensional information.

Specifically, the processor 120 generates an object graph from an observed path of an object and expresses the object graph by an adjacency matrix.

Next, the processor 120 not only produces an Mth-order adjacency matrix, which defines interrelation between objects according to each of M hops, and calculate object attribute information according to the interrelation between objects according to each of M hops based on the Mth-order adjacency matrix and feature information through a graph convolution layer of a high-order graph model (S430).

The Mth-order adjacency matrix may be produced by superposing M times a weighted adjacency matrix, which is obtained by applying a weight based on a distance between an object and an expected collision point and a distance between objects, on an adjacency matrix that expresses relation between objects. As an example, the Mth-order adjacency matrix may be produced by operating M involutions of a weighted adjacency matrix and thus may be produced at each number of the involutions.

The Mth-order adjacency matrix means a matrix that defines interrelation between objects according to M hops. Information on an object may be defined as a node of an object graph from data about an observed path of the object. Nodes for each of a plurality of objects are concatenated, and such concatenation, that is, an edge of an object graph may be represented by an adjacency matrix. Concatenation between a specific node and an Mth adjacent node (Multi-hop) may be defined or identified by an adjacency matrix that is obtained by operating M involutions of an adjacency matrix.

According to the present disclosure, an Mth-order adjacency matrix may be obtained by superposing a weighted adjacency matrix, which applies a weight to collision possibility based on a distance from an expected collision point, on an adjacency matrix that defines concatenation for a node. A process of producing the Mth-order adjacency matrix will be described in detail through FIG. 5. Accordingly, the Mth-order adjacency matrix includes the Mth indirect interrelation for each node and may be produced according to adjacent M hops between objects.

A node of an object may include information on a class, a behavior and a state of the object such as an attribute of the object, and for example, include information like a type of the object as class information, a location, a speed, an acceleration, and a heading angle as behavioral information. In addition or alternative, according to a type of an object, a node may include state information such as a pose of the object and semantic location information, and in the case of a pedestrian as an example, a node may include information on a gesture, a position, and a pose of carrying a thing, and a semantic location such as on a crosswalk, on a road, and on a sidewalk.

Information in a node is not limited to the above-described examples. Feature information may include the above-described node information, be defined by a matrix and be reflected in an Mth-order adjacency matrix.

An edge may mean a concatenation relation between nodes, and the concatenation relation may include information on importance as well as information regarding whether or not it is simple concatenation. In addition or alternative, an edge may include information a distance between nodes. According to the present disclosure, an edge may information on possibility of collision according to a distance to an expected point of collision with a node.

That is, according to the present disclosure, an object graph may represent a concatenation relation between nodes by an edge and include information on the object and information on possibility of collision according to a distance.

Next, the processor 120 calculate object attribute information according to an interrelation of each of M hops through a graph convolution layer that reflects feature information in an Mth-order adjacency matrix. Specifically, a graph convolution layer of a high-order graph model performs graph convolution to analyze an object graph consisting of a node and an edge (G=(V, E), V is a node, and E is an edge). The high-order graph model May be a type of graph convolution network (GCN) capable of processing data that have correlation in a graph format.

The graph convolution layer of the high-order graph model calculates object attribute information by matrix multiplication for feature information, the Mth-order adjacency matrix, a weight for learning interrelation between objects according to M hops. The process of calculating the object attribute information may be performed as shown in Formula 1 below.

$$H_m^{(l)} = \hat{A}^m X^{(l)} W_m^{(l)} \qquad \text{[Formula 1]}$$

The Mth-order adjacency matrix($\hat{A}^m$) may be obtained by applying a weight to the adjacency matrix(A) according to a distance to an expected point of collision with an object and a distance between objects, symmetrically normalizing the weighted adjacency matrix, and then squaring the normalized adjacency matrix M times. The superscript (m) denotes a number of times the weighted adjacency matrix is squared. ($\hat{A}$) The process of producing the weighted adjacency matrix will be described in detail through FIG. 5.

$X^{(l)}$ is feature information, that is, information on an attribute of an object represented as a node, which is defined by a matrix, and may include, for example, information on a class, a behavior, and a state of each node, and may include information on, for example, a type, a location, a speed, an acceleration, a heading angle, a pose, and a semantic position. The superscript (l) denotes a number of a graph convolution layer. The feature information May be differently designed according to a class of an object, that is, a type of the object. Consequently, as described below, a weight for learning interrelation between object according to each of M hops may be updated differently cording to a type of an object.

$W_m^{(l)}$ means a weight for learning interrelation between objects according to each of M hops of interrelation, and likewise, the superscript (l) denotes a number of a graph convolution layer. The finally calculated means object attribute information($H_m^{(l)}$).

Next, the processor 120 generates cumulative feature information through a combination layer that weighted integrates the object attribute information that is calculated by the above-described process (S440). For direct and indirect interrelation of objects, the combination layer may cumulatively weight an object with relatively higher importance according to each of M hops in interrelation of every object and thus represent the cumulative feature information represented as one representative vector.

The combination layer may combine information on every interrelation of each object according to each of M hops, thereby enabling a path of an object to be predicted more accurately.

Specifically, the processor 120 may extract a single piece of information from weighted summation of multiple pieces of object attribute information, which are calculated according to interrelation at each of M hops, through a combination layer of a multi-layer perceptron neural network structure, and the above-described process may be performed by Formula 2 below. Specifically, the processor 120 transforms object attribute information into a single vector format.

$$X^{(l+1)} = \mathcal{F}\left(\lambda_1 H_1^{(l)} \| \lambda_2 H_2^{(l)} \| \dots \| \lambda_m H_m^{(l)}\right) \qquad \text{[Formula 2]}$$

$\lambda_m$ denotes a weight for learning relation of object attribute information($H_m^{(l)}$) according to each hop of interrelation. "$\|$" denotes column concatenation. $X^{(l+1)}$ is cumulative feature information that is a value represented in a single vector and obtained by accumulating information on interrelation of objects according to each of M hops. The cumulative feature information is multiplied by the Mth-order adjacency matrix as feature information of a next-number (l+1) graph convolution layer. This will be described in detail through FIG. 8.

Next, the processor 120 embeds the cumulative feature information in a target node of an object graph (S450). The processor 120 may embed the cumulative feature information in the target node of the object graph and generate a high-order embedding vector of a vector structure produced therefrom.

Specifically, through an iterative structure of a graph convolution layer and a combination layer of a high-order graph model, the processor 120 may recursively reflect a cumulative picture matrix in an Mth-order adjacency matrix, thereby producing a high-order embedding vector that is an embedding vector representing a high-order interrelation between object.

The processor 120 may generalize cumulative feature information based on a result of iterative graph convolution layers and combination layers through a read-out process and then produce a high-order embedding vector through a fully connected (FC) layer.

Next, the processor 120 generates a predicted path of an object through a predicted path model based on an object graph with the cumulative feature information embedded therein (S460). The processor 120 predicts a path of an object through a predicted path model by using a high-order embedding vector that is produced from an object graph with cumulative feature information embedded therein.

As an example, the predicted path model may be an artificial intelligence (AI) with an encoder-decoder structure. A structure of a predicted path model is not limited to the above-described structure but may include an AI structure that predicts every structure of path to which a modularized high-order graph model is applicable.

A high-order graph model controlled by the processor 120 according to the present disclosure is an AI, which is completely trained by the server 200, and may be executed in a state of being combined with a predicted path model through modularization. As an example, a high-order graph model may be located in an input unit of an encoder of a predicted path model and thus provide a high-order embedding vector to the encoder. That is, according to the present disclosure, a high-order graph model may be configured to be applied as a plug-and-play model.

Hereinafter, a process of producing a weighted adjacency matrix will be described in detail through FIG. 5. The process of producing a weighted adjacency matrix is actually the same as the processing of the processor 120 and the server 200 of the mobility device 100, but for convenience of description, FIG. 5 will describe mainly the processing of the processor 120.

Figure 5:
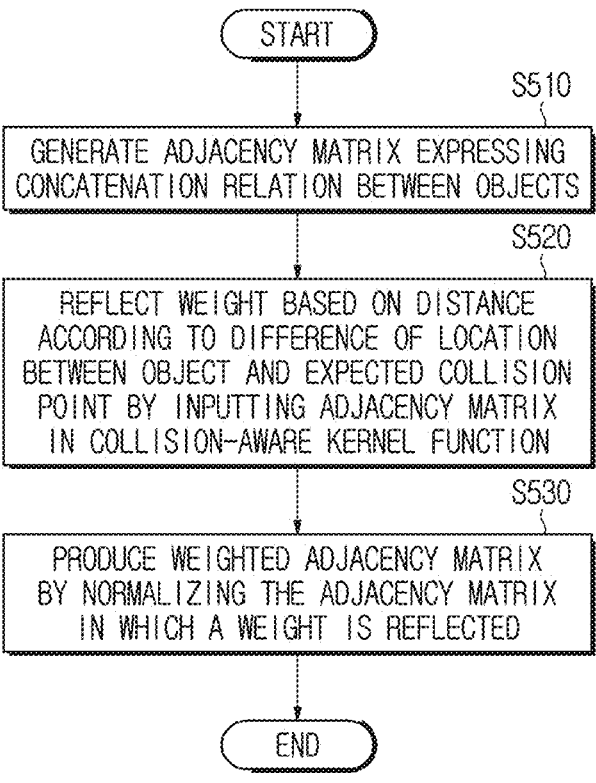
FIG. 5 shows an example of a flowchart showing a process of producing a weighted adjacency matrix.

FIG. 5 shows an example of a flowchart showing a process of producing a weighted adjacency matrix.

Referring to FIG. 5, the processor 120 generates an adjacency matrix that represents a concatenation relation between objects based on a received observed path (S510). The adjacency matrix means a representation of a concatenation relation between a node and a plurality of objects, that is, an edge of an object graph, and if there is a concatenation relation between objects, an element of 1 is allocated, and if there is no concatenation relation between objects, an element of 0 is allocated. Specifically, the server 200 generates an adjacency matrix at each timestamp of an object.

Next, the processor 120 inputs the adjacency matrix into a collision-aware kernel function and thus reflects a weight based on a distance according to a difference of location between an object and an expected collision point (S520).

Specifically, the processor 120 determines the expected collision point of the object by forming a direction vector with a current location being origin, based on the current location of the object and a heading angle of the object. Next, the server 200 determines the expected collision point by extending a half-line along the direction vector based on a current location of each object. A method of determining an expected collision point by the processor 120 is not limited to the time-series sequence of the above example, and any method of determining an expected collision point may be used as long as it is based on a current location and a heading angle. For example, when determining an expected collision point, a semantic map including semantic location information on environment of an object may be reflected. As an example, in case two objects are adjacent to each other but there is a nearby object that obstructs a path of an object, whether or not the two objects will collide with each other may be determined in consideration of the obstructing object. For convenience of understanding, a process of determining an expected collision point will be described additionally through FIG. 6.

Figure 6:
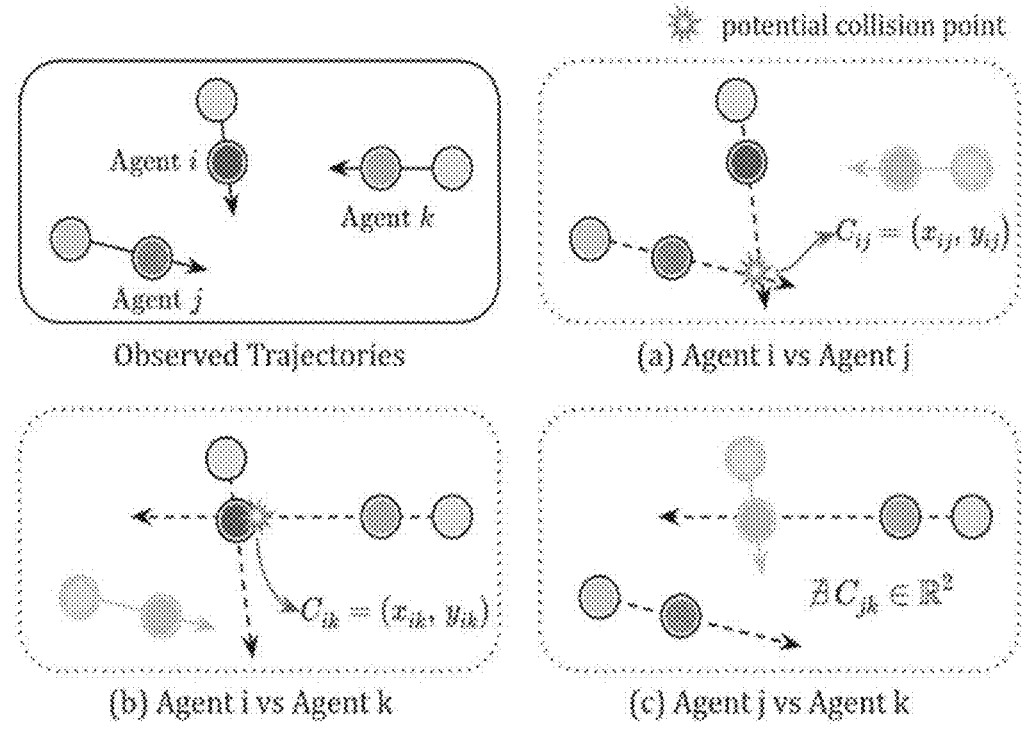
FIG. 6 shows an example of a process of determining an expected collision point of an object.

FIG. 6 shows an example of a process of determining an expected collision point of an object.

In (a) and (b) of FIG. 6, an expected collision point ($C_{ij}$, $C_{ik}$) is determined by extending a half line by a direction vector that is formed based on a current location and a heading angle of an object. An expected collision point may be produced as a coordinate on the coordinate plane. On the other hand, referring to (c) of FIG. 6, when extending half-lines along direction vectors based on a current location of each of the objects (Agent j and Agent k), if no intersection occurs, it may be determined that there is no expected collision point, so that a weight of 0 is applied to an element of an adjacency matrix representing a concatenation relation of a corresponding object. This will be described through FIG. 5.

Referring to FIG. 5 again, the processor 120 applies a weight to an adjacency matrix through a collision-aware kernel function that applies a weight according to a distance between an object and an expected collision point. In addition or alternative, the processor 120 reflects a weight according to a relative distance between objects to the adjacency matrix.

The process of applying, by the server 200, a weight according to distance and a weight according to a relative distance between objects to an adjacency matrix may be calculated by Formula 3 below.

$$g(a_{ij}) = \begin{cases} \dfrac{1}{d_{ij}\sum_{e \in \{i,j\}}\|C_{ij} - Q_e\|_2}, & \text{if } C_{ij} \in R^2 \\ 0, & \text{otherwise} \end{cases} \qquad \text{[Formula 3]}$$

$g(a_{ij})$ means a collision-aware kernel function that applies a weight to each element($a_{ij}$) based on a distance according to an object of an adjacency matrix. $C_{ij}$ means an expected collision point between objects, and $Q_e$ means a current location of a corresponding object (Agent i or Agent j). $d_{ij}$ means a distance between objects and may be calculated by $\|Q_i - Q_j\|_2$. That is, in case there is an expected collision point, the collision-aware kernel function reflects a weight based on a distance between the expected collision point and a current location of each object and a distance between objects, and in case there is no expected collision point, the collision-aware kernel function reflects a weight of 0. Accordingly, if each object becomes closer to an expected collision point and the possibility of collision becomes higher, a higher weight is reflected in the adjacency matrix.

Next, the processor 120 produces a weighted adjacency matrix by normalizing the adjacency matrix in which a weight is reflected (S530). The normalization may be performed by Formula 4 below.

$$\hat{A} = D^{-\frac{1}{2}}(A + I)D^{-\frac{1}{2}} \qquad \text{[Formula 4]}$$

D is a degree matrix including a concatenation degree for each object. For example, information on an object concatenated with a specific object, and I is an identify matrix. $\hat{A}$ is a symmetrically normalized adjacency matrix. According to the present disclosure, A of Formula 4 means each adjacency matrix in which a weight is reflected by a collision-aware kernel function.

Hereinafter, for convenience of understanding, an overall structure of a path analysis model combined with a high-order graph model and a predicted path model will be described through FIG. 7.

Figure 7:
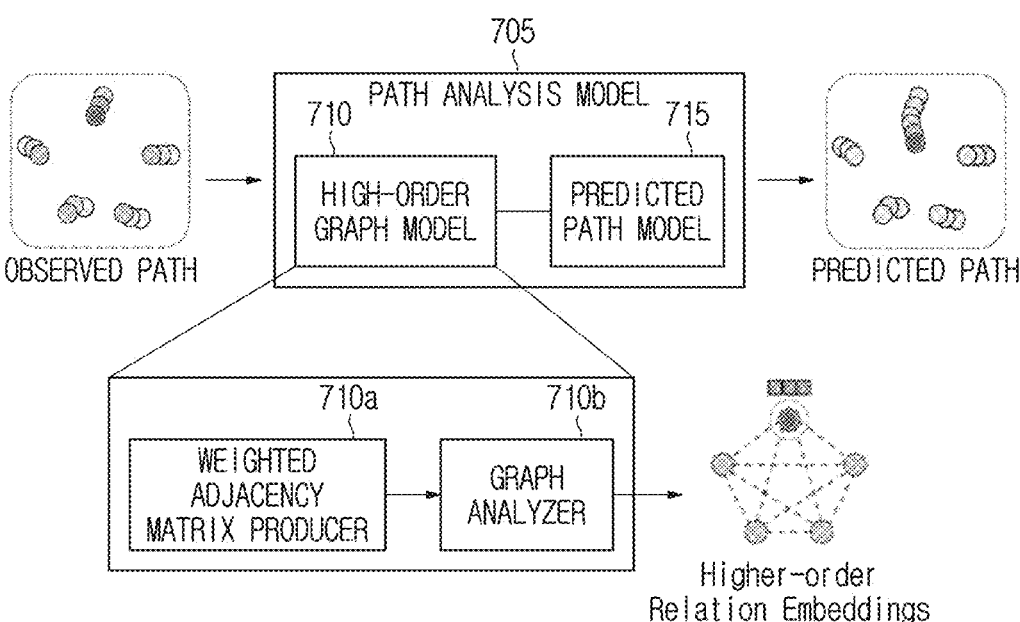
FIG. 7 shows an example of an overall structure for input/output relation of a path analysis model combined with a high-order graph model.

FIG. 7 shows an example of an overall structure for input/output relation of a path analysis model combined with a high-order graph model.

A path analysis model 705 may consist of a high-order graph model 710 and a predicted path model 715.

FIG. 7 exemplifies the high-order graph model 710 included in the path analysis model 705 but is not necessarily limited to internal concatenation.

According to the present disclosure, the high-order graph model 710 outputs a high-order embedding vector by using an observed path of an object. Next, the predicted path model 715 may generate a predicted path of the object by using the high-order embedding vector.

The high-order graph model 710 may include a weighted adjacency matrix producer 710a and a graph analyzer 710b. The weighted adjacency matrix producer 710a may produce a weighted adjacency matrix by the process described in FIG. 5.

Specifically, the graph analyzer 710b has a weighted adjacency matrix as input, which is generated by the weighted adjacency matrix producer 710a through a collision-aware kernel function of a high-order graph model.

Then, the graph analyzer 710b may embed cumulative feature information in an object graph through steps S430 to S450 of FIG. 4 and thus generate a high-order embedding vector.

Each layer of a high-order graph model implemented in the graph analyzer 710b is formed as a combination of a convolution layer and a combination layer and a repeated structure of the combined layers. Accordingly, cumulative feature information, which is an output of the combination layer, is reflected in a graph convolution layer of a next-number layer, and because of repetition of the structure, interrelations of objects according to each of M hops are cumulatively reflected in a high-order embedding vector (high-order relation embeddings) that is a final output. The detailed structure of a high-order graph model will be described through FIG. 9.

Hereinafter, a process of cumulatively reflecting cumulative feature information will be described through FIG. 8.

Figure 8:
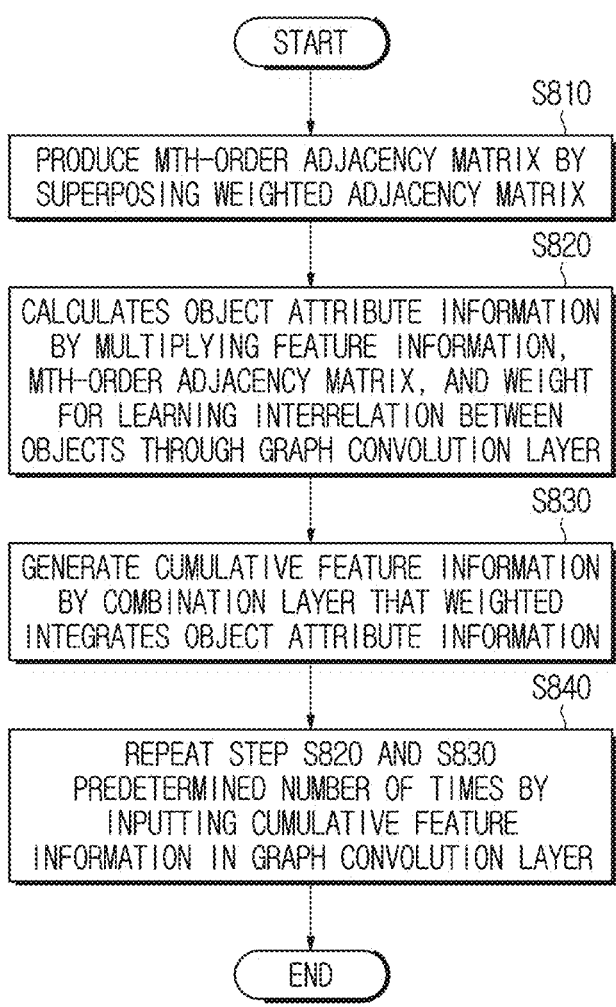
FIG. 8 shows an example of a flowchart showing a process of processing a graph convolution layer and a combination layer of a high-order graph model.

FIG. 8 shows an example of a flowchart showing a process of processing a graph convolution layer and a combination layer of a high-order graph model.

As for processing of a graph convolution layer and a combination layer according to FIG. 8, the processor 120 and the server 200 of the mobility device 100 are actually the same, but for convenience of description, the processing of the processor 120 will be mainly described.

First, the processor 120 produces an Mth-order adjacency matrix by using a weighted adjacency matrix (S810). Specifically, the processor 120 produces an Mth adjacency matrix according to each time by operating M involutions of the weighted adjacency matrix through a graph convolution layer.

Next, through the graph convolution layer, the processor 120 calculates object attribute information by matrix multiplication for feature information, the Mth-order adjacency matrix, and a weight for learning interrelation between objects (S820). The process of calculating the object attribute information may be performed by Formula 1. Next, the processor 120 generates cumulative feature information by combination that performs weighted integration of the object attribute information (S830). The process of generating the cumulative feature information may be performed by Formula 2.

Next, the processor 120 inputs the cumulative feature information into the graph convolution layer and repeats step S820 and step S830 a predetermined number of times (S840).

Specifically, the generated cumulative feature information is multiplied by the Mth-order adjacency matrix as feature information of a next-number (l+1) convolution layer. Like the previous number (l), the next-number graph convolution layer generates next-number object attribute information($H_m^{(l+1)}$) by multiplying cumulative feature information($X^{(l+1)}$), the Mth-adjacency matrix($\hat{A}^m$), and a weight ($W^{(l+1)}$) of the next-number graph convolution layer. Likewise, the next-number object attribute information($H_m^{(l+1)}$) is weighted integrated through a combination layer and thus is extracted as a single piece of information. Cumulative feature information generated and extracted as the single piece of information is multiplied with the Mth-order adjacency matrix as feature information of a next-number (l+2) convolution layer, and the processor 120 repeats the above-described process.

The number of repetitions for a combined structure of a graph convolution layer and a combination layer in a high-order graph model may be differently determined according to a user's setting or a system setting. For convenience of understanding, the above-described process will be visualized to describe an overall structure of a high-order graph model according to the present disclosure below.

Figure 9:
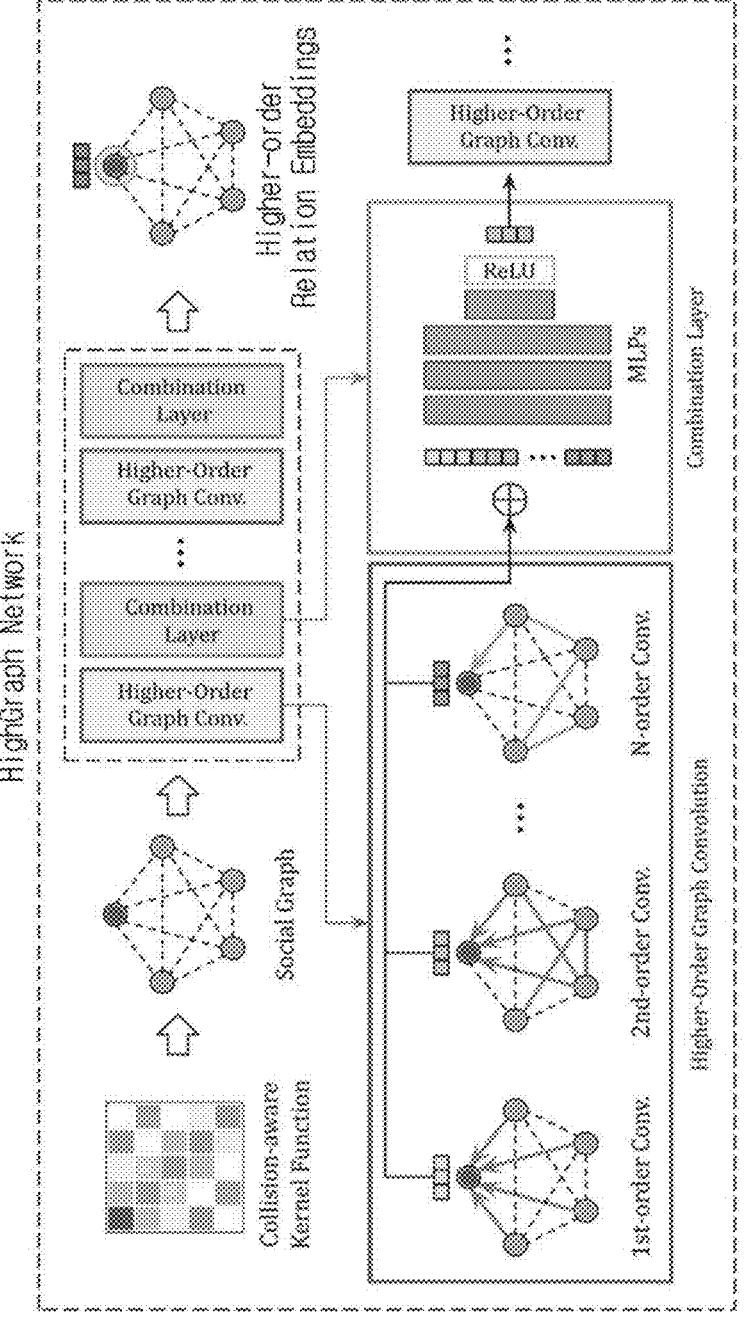
FIG. 9 shows an example of a high-order graph model structure that visualizes processing of a graph convolution layer and a combination layer.

FIG. 9 shows an example of a high-order graph model structure that visualizes processing of a graph convolution layer and a combination layer.

Referring to FIG. 9, a high-order graph model transforms interrelation between objects, which is represented by an object graph through a collision-aware kernel function (Social Graph), into a weighted adjacency matrix.

Next, a graph convolution layer of the high-order graph model produces object attribute information through graph convolution according to each of M hops of the interrelation between objects. Next, each piece of the object attribute information, which is produced according to each of M hops, is weighted integrated in a combination layer.

Specifically, each layer of the high-order graph model is formed as a combination of a convolution layer and a combination layer and a repeated structure of the combined layers. Accordingly, cumulative information, which is an output of the combination layer, is reflected in the graph convolution layer of a next-number layer. A combination layer may be configured as a multi-perceptron neural network structure, and a combination layer according to the present disclosure may use a ReLu function as an activation function but is not limited thereto. Cumulative feature information generated through a combination layer is reflected in a next-number graph convolution.

Hereinafter, referring to FIG. 10, processing of the server 200 for training a high-order graph model will be described.

The server 200 inputs an observed path of an object (S1010). Specifically, the server 200 constructs learning data based on a pre-stored observation path or an observed path received from the mobility device 100.

A received observed path is configured as a graph composed of a node and an edge (G=(V, E), V is a node, and E is an edge), and the server 200 produces an adjacency matrix based on the graph. The process of producing an adjacency matrix by the server 200 is actually the same as the processing of the processor 120 described in FIG. 5.

Then, the server 200 produces an Mth-order adjacency matrix based on an adjacency matrix of an object. Specifically, the processor 120 reflects a weight based on a distance according to a difference of location between an object and an expected collision point by using a collision-aware kernel function and then normalizes and produces a weighted adjacency matrix. Next, the server 200 produces an Mth-order adjacency matrix by squaring the normalized weighted adjacency matrix. The process of producing a weighted adjacency matrix and an Mth-order adjacency matrix by the server 200 is actually the same as the processing of the processor 120.

Next, the server 200 embeds the cumulative feature information in a target node of an object graph through a high-order graph model (S1020).

The server 200 calculates object attribute information in an actually same manner as the processing of the processor 120, generates a cumulative feature matrix, embeds cumulative feature information in an object graph, and thus generates a high-order embedding vector.

Next, the processor 120 generates a predicted path of an object through a predicted path model based on an object graph with the cumulative feature information embedded therein (S1030). The server 200 may predict a path of an object through a predicted path model by using a high-order embedding vector.

Next, the server 200 may determine whether or not model training should continue, by using a result of the predicted path model based on the object graph with the cumulative feature information embedded therein and a value derived from a loss function for comparison between the observed path of an object and ground truth data (S1040). According to determination, in case a value of the loss function based on resultant ground truth data of the observed path does not converge to a threshold range, the model training may continue. Specifically, in order to modify a weigh of the high-order graph model set at steps S1020 and S1030 until the value of the loss function converges in the threshold range, steps S1020 and S1030 may be performed again to continue the training (S1040). If the value of the loss function converges in the threshold range, the training may end.

As a high-order graph model according to the present disclosure defines an Mth-order adjacency matrix to increase a weight for a closer distance between an object and an expected collision point, the high-order graph model is not trained to prevent an object-to-object collision according to a simple distance between each pair of objects but is constructed to update an edge by applying a weight according to possibility of collision. In addition or alternative, a high-order graph model according to the present disclosure may be trained by adding a feature of node information according to a class of an object. As an example, training may be performed using feature information that is differently designed with additions of size, speed, acceleration, and maximum or minimum values of acceleration according to a type of an object.

Resultant improvements in quantitative or qualitative performance of a predicted path model by a high-order graph model will be described through FIG. 12 to FIG. 14.

Figure 11:
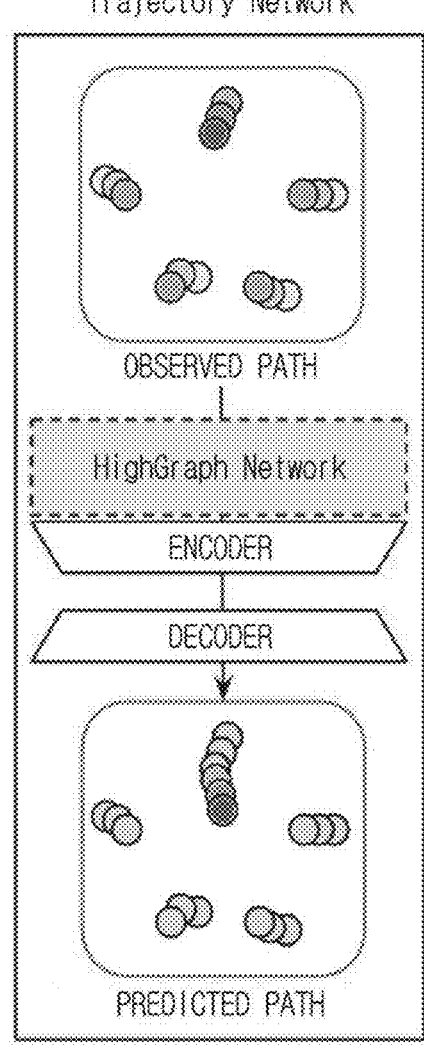
FIG. 11 shows an example of applying a high-order graph model to a predicted path model with encoder-decoder structure.

FIG. 11 shows an example of applying a high-order graph model to a predicted path model with encoder-decoder structure.

Referring to FIG. 11, a high-order graph model (High-Graph Network) may be modularized to be combined as a plug-and-play model and be merged in a predicted path model (Trajectory Network).

FIG. 11 exemplifies placement of the high-order graph model at an input end of an encoder of the predicted path model, but without being thereto, the high-order graph model may be placed so that output of a recurrent encoder of the predicted path model is input into the high-order graph model. Alternatively or additionally, placement may be performed in a structure where a high-order graph model according to the present disclosure replaces a module for performing graph convolution in a network. In addition or alternative, output of a high-order graph model being used as additional information may be merged with a feature of data input into a network.

FIG. 12 shows an example of quantitative increase and decrease of performance according to application of a high-order graph model to a predicted path model.

FIG. 12 shows that performance is improved by merging a high-order graph model according to the present disclosure with example networks such as Social-GAN, SoPhie, Social-STGCNN, BiTraP, and SocialVAE.

ETH, HOTEL, UNIV, ZARA1, ZARA2, and SDD mean datasets for observed paths of objects. As shown in the table of FIG. 12, if the high-order graph model according to the present disclosure was applied to the example networks using the above-described datasets, the performance was quantitatively improved.

Figure 13:
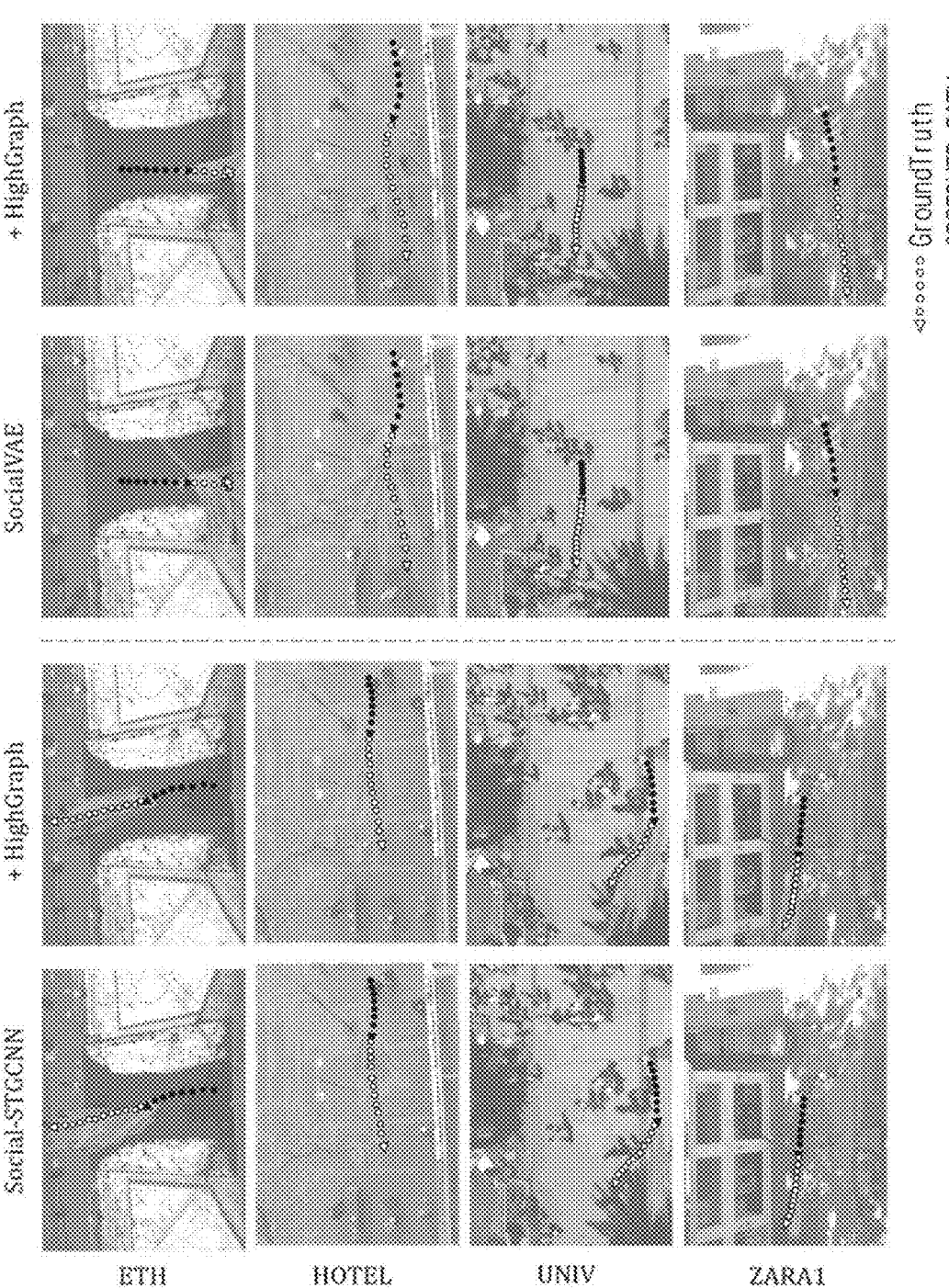
FIG. 13 shows an example of qualitative increase and decrease of performance according to application of a high-order graph model to a predicted path model.

FIG. 13 shows an example of qualitative increase and decrease of performance according to application of a high-order graph model to a predicted path model.

If the high-order graph model is applied to the example networks described above for each of the datasets, more refined and accurate paths are predicted as compared with the example networks.

Specifically, white points mean an observed path of an object, and black points means ground truth. A shadow area means a prediction distribution of a path of an object.

Prediction distributions obtained from the example networks and the application of the high-order graph model show that a more refined prediction distribution is produced by applying the high-order graph model.

For example, in case a path of a pedestrian is predicted using SocialVAE for the dataset HOTEL, a prediction distribution thus formed overlaps with a third pedestrian. On the other hand, if the high-order graph model is applied which analyzes interrelations between objects according to each of M hops, a prediction distribution thus formed predicts a path that evades the third pedestrian. Furthermore, the prediction distribution thus produced is closer to the ground truth.

Hereinafter, a prediction result of a path of an object according to cluster objects will be described through FIG. 14.

Figure 14:
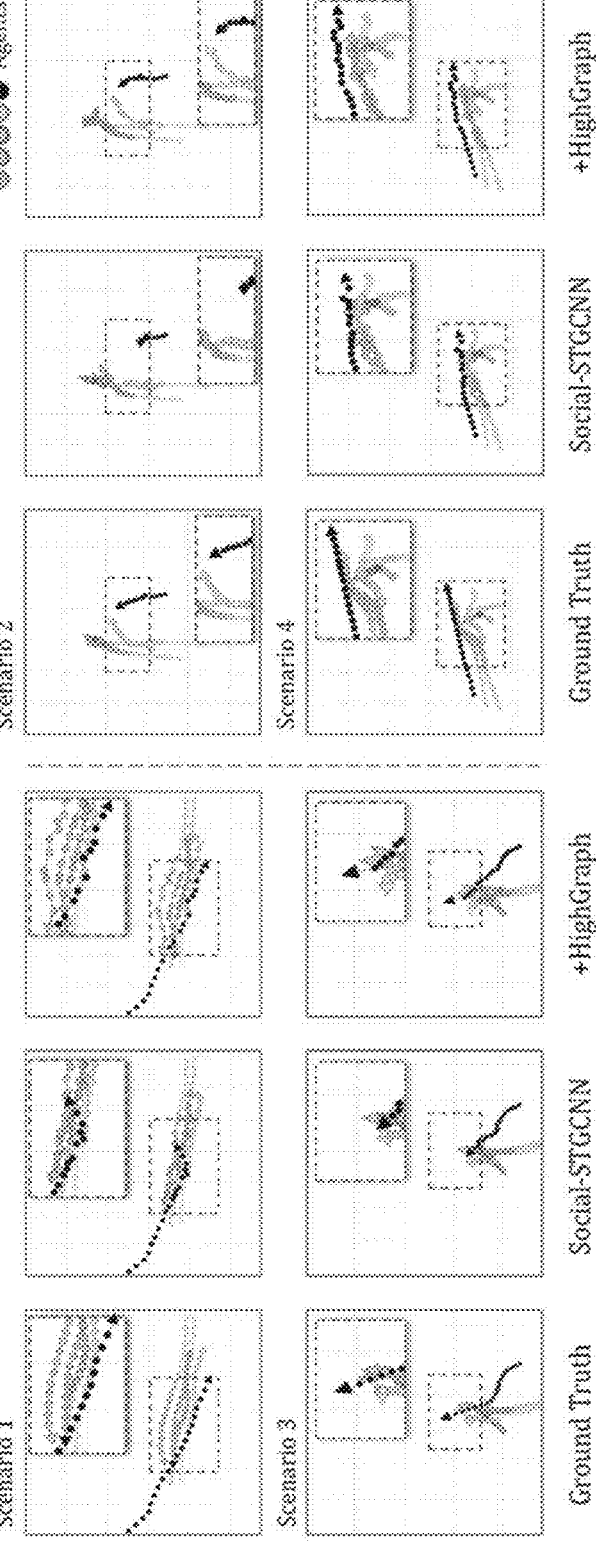
FIG. 14 shows an example of visualized comparison of path predictions considering interaction between cluster objects according to application of a high-order graph model.

FIG. 14 shows an example of visualized comparison of path predictions considering interaction between cluster objects according to application of a high-order graph model.

As pedestrians behave frequently in clusters, interrelation between objects is a more significant factor in determining a path of a specific object. Accordingly, in order to predict a path of an object, analysis is needed for a situation where a plurality of objects behaving in clusters are moving in a predetermined direction, that is, a situation where the objects behaving in clusters are heading toward each other.

Scenario 1 is a prediction result for a moving path of objects in case a plurality of objects is heading toward each other. Ground Truth shows that a plurality of objects heading in parallel (1-hop interrelation) change a path to evade collision with oncoming objects (black points). Accordingly, a predicted path of a network (e.g., Social-STGCNN) does not consider interrelation between objects according to each of M hops and is subject to collision. On the other hand, if the high-order graph model according to the present disclosure is applied, as interrelation is carefully considered according to each of M hops, it is predicted that a plurality of objects heading in parallel change their path to the right in order to evade collision with oncoming objects (2-hop interrelation), and the oncoming objects also change their path to the right to evade the plurality of object heading in parallel (3-hop interrelation). That is, if the high-order graph model is applied, an impact of a specific object on another object and an impact of another object on yet another object may be considered more accurately.

The present disclosure is technically directed to providing a method for predicting a path of an object by using a high-order graph model (HighGraph Network) that captures indirect interrelation between objects, that is, through interaction analysis between objects using an artificial intelligence, and a mobility device using the method.

The technical problems solved by the present disclosure are not limited to the above technical problems and other technical problems which are not described herein will be clearly understood by a person having ordinary skill in the technical field, to which the present disclosure belongs, from the following description.

According to the present disclosure, there is provided a method for predicting a path through interaction analysis between objects using an artificial intelligence, the method may comprising: producing a weighted adjacency matrix from an object graph based on a location relative to an expected collision point between the objects; producing, through a graph convolution layer of a high-order graph model, an Mth-order adjacency matrix, which defines interrelation between the objects according to each of M hops, by using the weighted adjacency matrix, and calculating object attribute information according to interrelation at each of M hops based on the Mth-order adjacency matrix and feature information defining an attribute of the object; generating, through a combination layer of the high-order graph model, cumulative feature information by weighted integrating the object attribute information; and embedding the cumulative feature information in a target node of the object graph and generating a predicted path of the object through a predicted path model based on the embedded object graph.

According to another example of the present disclosure, there is provided a mobility device for predicting a path through interaction analysis between objects using an artificial intelligence, the mobility device May comprising: a memory configured to store at least one instruction; and a processor configured to execute the at least one instruction stored in the memory based on data obtained from the memory, wherein the processor is may further configured to: produce a weighted adjacency matrix from an object graph based on a location relative to an expected collision point between the objects, produce, through a graph convolution layer of a high-order graph model, an Mth-order adjacency matrix, which defines interrelation between the objects according to each of M hops, by using the weighted adjacency matrix, and calculate object attribute information according to interrelation at each of M hops based on the Mth-order adjacency matrix and feature information defining an attribute of the object, generate, through a combination layer of the high-order graph model, cumulative feature information by weighted integrating the object attribute information, and embed the cumulative feature information in a target node of the object graph and generate a predicted path of the object through a predicted path model based on the embedded object graph.

According to the example of the present disclosure in the method, the producing of the weighted adjacency matrix may applies a weight to an adjacency matrix expressing concatenation relation between the objects based on a distance between the object and the expected collision point and a distance between the objects.

According to the example of the present disclosure in the method, the expected collision point is may be determined by an intersection between half-lines according to a direction vector of the object based on a current location of the object.

According to the example of the present disclosure in the method, the expected collision point is may calculated by reflecting a semantic map that includes semantic location information on environment of the object.

According to the example of the present disclosure in the method, the calculating of the object attribute information is may matrix multiplication for the feature information, the Mth-order adjacency matrix, and a weight for learning the interrelation between the objects at each of the M hops.

According to the example of the present disclosure in the method, the Mth-order adjacency matrix is may be produced according to each number of superpositions based on M superpositions of the weighted adjacency matrix.

According to the example of the present disclosure in the method, the cumulative feature information is may generated by extracting multiple pieces of the object attribute information, which are calculated according to the interrelation at each of the M hops, as a single piece of information through the combination layer.

According to the example of the present disclosure in the method, the extracting as the single piece of information may concatenates the object attribute information at each of the M hops through weighted integration based on a learnable weight allocated according to each of the hops and extracts the single piece of information from the object attribute information concatenated through the weighted integration.

According to the example of the present disclosure in the method, the high-order graph model is may modularized as a plug-and-play structure and is combined with the predicted path model.

According to the example of the present disclosure in the method, the feature information may include behavioral information and state information according to each class of the object.

The features briefly summarized above for this disclosure are only examples of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, it is possible to provide a method for predicting a path of an object by using a high-order graph model (HighGraph Network) that captures indirect interrelation between objects, that is, through interaction analysis between objects using an artificial intelligence, and a mobility device using the method.

According to the present disclosure, it is possible to provide a high-order graph model that analyzes direct interrelation between objects or indirect interrelation according to each of M hops.

According to the present disclosure, it is possible to analyze indirect interrelation between objects by applying a weight to an adjacency matrix defining interrelation between objects based on a distance from an expected collision point.

According to the present disclosure, it is possible to predict the possibility of collision between objects more accurately by reflecting a semantic map in an adjacency matrix that defines interrelation between the objects.

According to the present disclosure, it is possible to provide a plug-and-play high-order graph model that is applicable to various path prediction models.

The effects obtainable from the present disclosure are not limited to the above-mentioned effects, and other effects not mentioned herein will be clearly understood by those skilled in the art through the following descriptions.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various examples of the present disclosure are not a list of all possible combinations and are intended to describe representative examples of the present disclosure, and the matters described in the various examples may be applied independently or in combination of two or more.

In addition or alternative, various examples of the present disclosure may be implemented in hardware, firmware, software, or a combination thereof. In the case of implementing the present disclosures by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A method for controlling an autonomous driving of a vehicle, the method comprising:

generating, based on a location relative to an expected collision point between objects, a weighted adjacency matrix from an object graph, wherein the object graph represents a relation between the objects;

generating, based on the weighted adjacency matrix and a graph convolution layer of a high-order graph model, an Mth-order adjacency matrix, wherein the Mth-order adjacency matrix defines interrelations between the objects at each of M number of hops, and wherein the high-order graph model captures indirect interrelations between the objects;

determining, based on the Mth-order adjacency matrix and feature information defining an attribute of an object, object attribute information;

generating, based on a combination layer of the high-order graph model, cumulative feature information by integrating the object attribute information, wherein the object attribute information is weighted for the integrating;

embedding the cumulative feature information into the object graph, wherein the cumulative feature information is embedded into a target node of the object graph;

generating, based on the embedding and a predicted path model, a predicted path of the object; and outputting, based on the predicted path of the object, a signal for controlling the autonomous driving of the vehicle.

2. The method of claim 1, wherein the generating the weighted adjacency matrix comprises applying a weight to an adjacency matrix, wherein the adjacency matrix expresses, based on a distance between the object and the expected collision point and based on a distance between the objects, concatenation relations between the objects.

3. The method of claim 1, wherein the expected collision point is determined, based on a direction vector of the object, by an intersection between half-lines, wherein the direction vector is formed based on a current location of the object.

4. The method of claim 1, wherein the expected collision point is determined by reflecting a semantic map that comprises semantic location information on environment of the object.

5. The method of claim 1, wherein the determining the object attribute information comprises performing matrix multiplication for the feature information, the Mth-order adjacency matrix, and a weight for learning the interrelations between the objects at each of the M number of hops.

6. The method of claim 1, wherein the Mth-order adjacency matrix is generated based on M number of superpositions of the weighted adjacency matrix.

7. The method of claim 1, wherein the generating the cumulative feature information comprises generating the cumulative feature information by extracting multiple pieces of the object attribute information as a single piece of information through the combination layer, wherein the determining the object attribute information comprises determining the object attribute information based on the interrelations between the objects at each of the M number of hops.

8. The method of claim 7, wherein the extracting comprises:

concatenating, based on a learnable weight allocated according to each of the M number of hops and weighted integration, the object attribute information at each of the M number of hops; and extracting the single piece of information from the concatenated object attribute information.

9. The method of claim 1, wherein the high-order graph model is modularized as a plug-and-play structure and is combined with the predicted path model.

10. The method of claim 1, wherein the feature information comprises behavioral information and state information according to a class of the object.

11. An apparatus for controlling an autonomous driving of a vehicle, the apparatus comprising:

a processor; and a memory configured to store at least one instruction, when executed by the processor, cause the apparatus to:

produce, based on a location relative to an expected collision point between objects, a weighted adjacency matrix from an object graph, wherein the object graph represents a relation between the objects;

produce, based on the weighted adjacency matrix and a graph convolution layer of a high-order graph model, an Mth-order adjacency matrix, wherein the Mth-order adjacency matrix defines interrelations between the objects at each of M number of hops, and wherein the high-order graph model captures indirect interrelations between the objects;

determine, based on the Mth-order adjacency matrix and feature information defining an attribute of an object, object attribute information;

generate, based on a combination layer of the high-order graph model, cumulative feature information by integrating the object attribute information, wherein the object attribute information is weighted for the integrating; and embed the cumulative feature information into the object graph, wherein the cumulative feature information is embedded into a target node of the object graph;

generate, based on the embedment and a predicted path model, a predicted path of the object; and output, based on the predicted path of the object, a signal for controlling the autonomous driving of the vehicle.

12. The apparatus of claim 11, wherein the at least one instruction, when executed by the processor, further cause the apparatus to apply a weight to an adjacency matrix, wherein the adjacency matrix expresses, based on a distance between the object and the expected collision point and based on a distance between the objects, concatenation relations between the objects.

13. The apparatus of claim 11, wherein the expected collision point is determined, based on a direction vector of the object, by an intersection between half-lines, wherein the direction vector is formed based on a current location of the object.

14. The apparatus of claim 11, wherein the expected collision point is determined by reflecting a semantic map that comprises semantic location information on environment of the object.

15. The apparatus of claim 11, wherein the at least one instruction, when executed by the processor, further cause the apparatus to perform matrix multiplication for the feature information, the Mth-order adjacency matrix, and a weight for learning the interrelations between the objects at each of the M number of hops.

16. The apparatus of claim 11, wherein the Mth-order adjacency matrix is produced based on M number of superpositions of the weighted adjacency matrix.

17. The apparatus of claim 11, wherein the at least one instruction, when executed by the processor, further cause the apparatus to:

determine the object attribute information based on the interrelations between the objects at each of the M number of hops; and extract multiple pieces of the object attribute information as a single piece of information through the combination layer.

18. The apparatus of claim 17, wherein the at least one instruction, when executed by the processor, further cause the apparatus to concatenate, based on a learnable weight allocated according to each of the M number of hops and weighted integration, the object attribute information at each of the M number of hops; and extract the single piece of information from the object attribute information concatenated.

19. The apparatus of claim 11, wherein the high-order graph model is modularized as a plug-and-play structure and is combined with the predicted path model.

20. The apparatus of claim 11, wherein the feature information comprises behavioral information and state information according to a class of the object.

* * * * *